Figure 1:
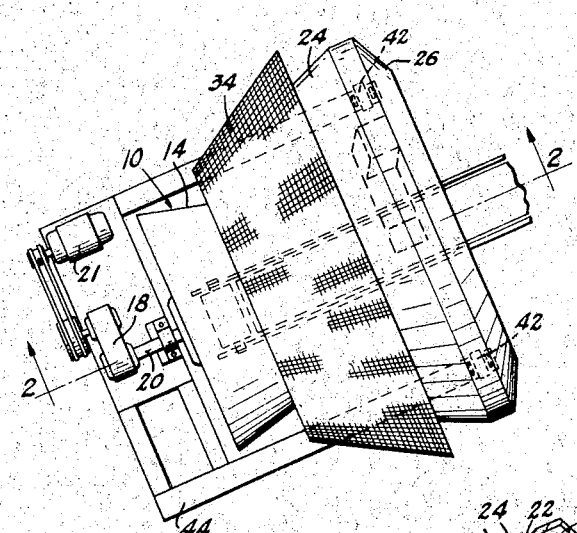

Oct. 5, 1965  H. T. STIRLING  3,210,772
PELLETIZING AND SIZING DRUM
Filed April 19, 1963

United States Patent Office 3,210,772
Patented Oct. 5, 1965

3,210,772
PELLETIZING AND SIZING DRUM
Harold T. Stirling, Pittsburgh, Pa., assignor, by mesne assignments, to Stirling Sintering Corporation, a corporation of Pennsylvania
Filed Apr. 19, 1963, Ser. No. 274,251
8 Claims. (Cl. 18—1)

The present invention relates to an apparatus for the production of sized, pressure-hardened balls or pellets from pulverulent material.

Many industrial processes result in the production of a substantial amount of material in the form of fine dust-like material. It is impossible to utilize such material without first processing the material into sized agglomerates. Such pulverulent material is becoming available in vast quantities.

The equipment used to increase the particle size of fine granular material by joining the fines together to form larger spherically shaped particles, imparts a rolling and cascading action to the dampened fine material. It has been known heretofore to introduce pulverulent material and water into a rotary drum for the purpose of clustering the pulverulent material into larger masses. Such masses are soft, irregular in shape and size, and possess insufficient mechanical strength for further handling and processing.

A large number of process variables are involved in agglomerating fine material into pellets. When individual particles are subjected to rolling action in a pelletizer to form spherical bodies the force of gravity can apply a large pressure to the small particles on the surface of the spherical body. As the spherical bodies come into intimate contact, some of the uneven edges may be broken off thus creating fines to fill in void spaces on other spherical bodies. It is commonly believed that the particles are held together by capillary attraction caused by water in the wet bodies coupled with molecular adhesion between the closely jammed surfaces.

In order to join fines together successfully by balling or pelletizing, the many operating variables must be adjusted to the most desirable value if optimum results are to be obtained. These variables include the retention time within a given machine which is a function of the slope and the feed rate, the speed of revolution of the machine, the preparation of the mix before balling, and the correct design of the machine in order to obtain the best action for balling or pelletizing.

For a given machine, the holding capacity and hence the retention time at a given feed rate changes with the slope of the machine. The greater the slope, the smaller the retention time and vice versa. For a given machine at a constant slope the retention time varies with the feed rate. The faster the feed rate, the shorter is the retention time. A long retention time is desirable because the size of the balls thus produced can thereby be increased, however, when pellets of a particular size are desired, it is necessary to adjust the slope of the pelletizing drum so that the pellets are retained for the proper period of time. For example, if pellets with diameters between the limits of 3/8 to 1/2 inch are desired, too long a retention time may cause the formation of pellets having diameters greater than 1/2 inch and too short a retention time may cause the formation of pellets which do not grow large enough to meet the 3/8 inch lower limit.

The speed of the machine must also be adjusted for proper action. The walls must revolve at a speed which will give the material a gentle rolling and cascading action to promote the continuous growth of balls or pellets by picking up fines as the balls roll across the fine particulate feed material.

The most common pelletizing drum heretofore used was a simple drum in the form of a cylinder. This type of drum had many disadvantages, for example, the pellet once formed had to work its way through the length of the entire drum before it was discharged and unpelletized fine material was also carried through the drum. A special conveyor was necessary for recirculating these undersized fines back to the feed end of the drum. The pellets formed in this type of drum were not uniform in size or shape and were too soft to possess sufficient mechanical strength for further processing. Another disadvantage of these drums is that they are extremely large and therefore consume a great quantity of space.

Another type of pelletizing apparatus heretobefore used is that known as the disc pelletizer. A disc pelletizer has a rather low retention time thus causing low production and yielding insufficiently large pellets. In addition, the finished pellets are not uniform in size and the rolling action is poor thus resulting in soft pellets having an insufficient mechanical strength. The use of a core pelletizer has also been proposed, but this type of apparatus suffers from similar disadvantages.

It is an object of this invention to form balls or pellets of a predetermined size which balls possess sufficient mechanical strength to be handled without disintegration by standard equipment, such as conveyors, screens, etc.

In accordance with the invention there is provided a novel apparatus for processing pulverulent material into balls or pellets. The apparatus comprises a drum in the shape of a truncated cone in which the back wall of the drum is formed as the base of the truncated conical member. The small end of the truncated conical member is open for discharging pellets. Incoming feed is introduced through the center of the opening by means of a feed conveyor. The drum operates on a slope of from 15°-35° upwards from the horizontal, and preferably the slope should be about 25°. The dimensions of the drum are such that the ratio of the depth of the drum, to the large diameter of the base, to the small diameter of the open end is 0.35–0.80:1.0:0.50–0.90 and preferably this ratio is about 0.6:1.0:0.75. The angle which the sides of the conical member form with the base of the member should be between about 70 and 90° and is preferably about 78°.

Attached to the open end of the drum is a concentric helically wound screen, the strands of which are spaced a predetermined distance apart, for example, approximately 1/2 inch. A lifter cone is provided to catch the oversize pellets (greater than 1/2 inch) as they roll off the 1/2 inch screen. A second screen, for example, a 3/8 inch helically wound screen is concentrically arranged around the 1/2 inch screen. These screens can be replaced with any size screen which will give the desired top and bottom sizes. For example, a one inch screen and a 7/8 inch screen can be substituted for the 1/2 inch and 3/8 inch screens or 1/4 inch and 1/8 inch screens can also be used.

The lifter cone is provided with lifts which raise the oversize and undersize material and drop both into a chute which returns the material to the feed conveyor and thence back into the pelletizing drum.

Pellets of the predetermined desired size, for example, −1/2 and +3/8 inch pass through the 1/2 inch screen and are retained on the 3/8 inch screen to be then passed to a frustoconical roll dryer from which the finished pellets are passed to discharge. A hot air duct is provided to force hot air through the roll dryer to at least partially dry the pellets before they are discharged.

The geometric shape of the pelletizing drum is precisely suited to uniform pellet formation and is designed to produce a better rolling action than is accomplished by other known pelletizers. This better rolling action eliminates to a great extent the free travel period that occurs in equipment such as the disc pelletizer during which the pellets are carried up without any rolling.

The truncated cone with the small discharge end holds larger quantities of material than is possible in other equipment thus providing a longer retention time than other revolving equipment of equal size.

The large volume of material being processed results in a great depth of material, and a long chord across the rolling face creates an excellent rolling action in which some of the pellets are rolled down over others which are rolling up. The weight of material on top tends to hold the material underneath in a wedge-like position against the sloping base and side wall which form an angle of approximately 78° so that each particle is carried farther up on each revolution than it would be in other known pelletizers. As the balls or pellets are being carried up, some are also rolling. When they reach the top, they cascade back down again. Because of the greater depth of material and the larger number of balls more force is applied at each point of contact between the balls or pellets as they travel up and those travelling down. In addition, these points of contact are more numerous. Pressures are thereby created on the surface of the balls which are many times greater than they would be if there were only one layer of balls resting on or rolling on a moving surface as, for example, in a common cylinder drum.

Because the material is wedged into the pelletizer as it travels upward, the drum does not have to subject each particle to a high centrifugal force to keep it from slipping down. Therefore the peripheral speed of the pelletizing drum can be only about ½ that of other pelletizers resulting in a reduction in operating cost. Because of the novel angularity and arrangement of the drum, the fine material tends to be retained towards the base of the drum while the fully formed pellets discharge from the small diameter end of the pelletizer by rolling their way up the wall which is maintained at a slope of approximately 37°.

The sized green pellets discharged from the drum are further upgraded when they are passed to the roll dryer where warm air is passed across the pellets. The air carries away part of the moisture thereby producing a partially dried upgraded pellet which is easier to handle because it is stronger and denser. This upgraded pellet is discharged onto a conveyor which carries it to sintering or heat hardening equipment such as is shown in my co-pending application, Serial No. 243,376, filed December 10, 1962.

The oversize and undersize material discharges into the lifter cone which has a slope of between 25° and 75°. The lifter cone is provided with peripheral lifters which pick the material up to a point between 1 o'clock and 2 o'clock at which point the force of gravity causes the material to fall down onto a chute which leads the material to the feed conveyor belt. It is then carried into the drum along with the new feed. The head end of the conveyor feeder has an adjustable roll crusher thereon which is driven by the head pulley and the oversize material is thereby crushed. The rolls are set slightly closer than the predetermined top size thereby crushing all oversize pellets and returning them directly into the pelletizer drum without the necessity of a special recirculating conveyor.

The desired pellet size (e.g., —½ +⅜ inch) can be programmed into the screens and because of the design of the appartus and the shape of the truncated cone, the drum will produce pellets of a desired size substantially constantly without any substantial amount of material passing into the lifter cone for recirculation. The pellet size can be controlled by slight changes in the slope, speed, feed rate, etc.

Exemplary of the known fine materials that have been successfully pelletized in the novel pelletizing drum of this invention are: basic oxygen furnace dust, bauxite, iron ore fines, iron oxides, copper fines, the non-magnetic fraction of fly ash such as from steam generating plants, the magnetic fraction of fly ash, stainless steel grindings, glass grinding fines, shale, red dog, zinc, vanadium, limestone, phosphate rock, chrome ore fines, iron concentrates, certain ceramic fines, chromium and nickel fines, iron sulfate, coal refuse, clay, lead, cobalt, dolomite, coal, sodium sulfate, and other salts, etc.

Figure 2:
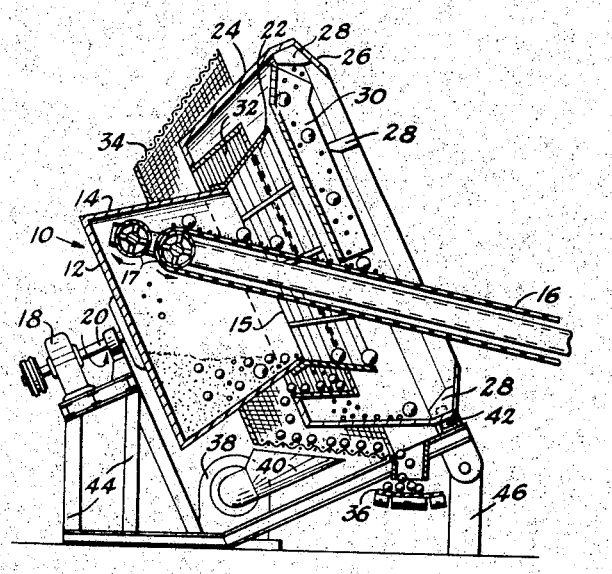

The invention further resides in certain novel features of the construction and in the combination and arrangement of parts of the apparatus in which the invention is embodied; and further objects and advantages of the invention will be apparent to those skilled in the art to which the invention pertains from the following description of the present preferred embodiment thereof described with reference to the accompanying drawings in which:

FIGURE 1 is a plan view of the pelletizing and sizing drum of the invention, and FIGURE 2 is a cross-sectional elevational view of the apparatus shown on lines 2—2 of FIGURE 1.

Referring to the drawings, it will be seen that the illustrated apparatus embodying the invention comprises a drum 10 in the shape of a truncated cone in which the back wall 12 of the drum is formed as the base of the conical member. The side wall 14 of the drum 10 extends from the base 12 to an open end which forms the small end of the truncated conical member. A feed conveyor 16 supplies feed material to the drum 10. When material has been fed to the drum 10 the drum is rotated by suitable means such as drive means 18 and drive shaft 20 which in turn are driven by suitable means such as variable speed motor 21.

As the drum rotates, pellets are formed which pellets tend to roll upwardly along the wall 14 of the drum 10 and discharge through the mouth 15 of the drum onto a helically wound screen 22 operatively attached to the mouth end 15 of the drum 10. The strands of the screen 22 are spaced a predetermined distance apart so that oversize pellets (those which are larger than the predetermined size) remain upon the helically wound screen 22 and are discharged from said screen into lifter cone 24. The lifter cone 24 is open-ended and is formed in the shape of a truncated conical member, the small end of the lifter cone 24 faces towards the drum 10. The base of the lifter cone is provided with a peripheral inwardly facing flange 26 to catch any material falling into the lifter cone. Lifters 28 are spaced around the periphery of the lifter cone at the juncture between the lifter cone 24 and its flange 26. As material falls into the lifter cone 24 it rolls until it reaches the lifters 28 which then lift the material to a position between 1 o'clock and 2 o'clock at which point gravity causes the material to slide off the lifters 28 and fall into chute 30 which leads the material back to the feeder belt 16 on which belt the material is returned to the drum 10.

Pellets having a size smaller than the predetermined distance between the strands of the screen 22 pass through the screen 22 and drop onto a second concentric screen 32. Screen 32 is helically wound and comprises strands wound a predetermined but smaller distance apart than the strands of screen 22. Any fine material discharged from the drum 10 will pass through both screens 22 and 32. Undersize material passing through screen 32 falls into the lifter cone 24 and is recycled along with the oversize material from screen 22. Pellets having a size between the predetermined sizes of the screens 22 and 32 for example, —½ +⅜ inch material falls through screen 22 and is retained on screen 32. The material then rolls from screen 32 onto a roll drying screen 34 which comprises perpendicular strands spaced ⅛ inch apart. These product pellets which pass to roll drying screen 34 roll thereon and are discharged onto a belt conveyor 36 which carry the pellets to sintering or heat hardening equipment for further processing.

While the sized green pellets are rolling on the screen dryer 34 warm air is passed therethrough and across the pellets. The air carries away a portion of the moisture thereby producing a partially dry pellet which is easier to handle because it is stronger and denser. The warm air is passed through screen dryer 34 by means of a blower 38 and hot air duct 40.

The entire apparatus including the drum 10, screens 22, 32, lifter cone 24, and roll dryer 34 rotate together as the drum 10 is rotated by means of drive 18. The lifter cone 24 is supported and rotates on idler roll 42 and the entire structure is supported by structural supports 44, 46.

In operation, feed material is passed into drum 10 by means of feed conveyor 16. Drum 10 is rotated by drive means 18 and drive shaft 20 which in turn are driven by variable speed motor 21. The material in the drum is caused to roll and cascade therein thereby forming pellets. To aid in the formation of pellets water sprays (not shown) may be positioned within the drum 10. As the pellets are formed they ride upwardly along wall 14 of drum 10 and are discharged onto helically wound screen 22. Oversize material is retained on screen 22 and discharged therefrom into lifter cone 24. Undersize material passes through screen 22 and screen 32 and is also discharged into lifter cone 24. The properly sized pellets pass through screen 22 and are retained on screen 32 to be discharged onto roll dryer 34 where warm air is passed over the green pellets. The partially dried pellets are then passed to belt conveyor 36 for further processing. The oversize and undersize material passing into lifter cone 24 is lifted by lifters 28 and dropped in chute 30 from whence they are discharged onto feed conveyor 16 and recycled to the drum 10. The material on feed conveyor 16 is passed through crushing rolls 17 whereby the oversize material is crushed, and the feed and recirculated material is then dropped into the drum 10. When necessary a water spray (not shown) may be located within the drum 10 to add moisture to the material therein to aid in balling the material.

I claim:

1. Apparatus for the production of pressure hardened pellets from pulverulent material comprising, a rotatably mounted truncated conical drum member for forming pellets from said pulverulent material, said drum member having a base forming the back wall of the drum, a side wall and an open upper end, said drum being mounted at an angle of between about 15 and 35° upwards from the horizontal, the ratio of the length of said side wall of said drum to the diameter of said base to the diameter of said open end being about 0.35–0.80:1.0:0.50–0.90, a pair of concentric sizing screens mounted adjacent the open end of said drum to separate oversize and undersize pellets from pellets of a predetermined size, a concentrically arranged truncated conical lifter means for receiving said oversize and undersize pellets from said sizing screens, said lifter means being mounted adajacent the open end of said drum and having a larger diameter than and surrounding said sizing screens, lifting members circumferentially positioned around the periphery of said lifter means for lifting said oversize and undersize pellets, a feed conveyor for said drum, chute means to recycle material from said lifter means to said feed conveyor, a roll dryer concentrically mounted around said drum and adapted to receive said pellets of a predetermined size from said sizing screens, and means to pass air through said roll dryer to partially dry said sized pellets.

2. Apparatus for the production of pressure hardened pellets from pulverulent material comprising, a rotatably mounted truncated conical drum member for forming pellets from said pulverulent material, said drum member having a base forming the back wall of the drum, a side wall, and an open upper end, a pair of concentric sizing screens mounted adjacent the open end of said drum to separate oversize and undersize pellets from pellets of a predetermined size, a roll dryer concentrically mounted around said drum and adapted to receive said pellets of a predetermined size from said sizing screens, and means to pass air through said roll dryer to dry said size pellets.

3. Apparatus for the production of pressure hardened pellets from pulverulent material comprising, a rotatably mounted truncated conical drum member for forming pellets from said pulverulent material, said drum member having a base forming the back wall of the drum, a side wall, and an open upper end, a pair of concentric sizing screens mounted adjacent the open end of said drum to separate oversize and undersize pellets from pellets of a predetermined size, a concentrically arranged truncated conical lifter means for receiving said oversize and undersize pellets from said sizing screens, said lifter means being mounted adjacent the open end of said drum, lifting members circumferentially arranged around the periphery of said lifter means for lifting said oversize and undersize pellets, a feed conveyor for said drum, and means to recycle material from said lifter means to said feed conveyor.

4. Apparatus for the production of pressure hardened pellets from pulverulent material comprising, a rotatably mounted truncated conical drum member for forming pellets from said pulverulent material, said drum member having a base forming the back wall of the drum, a side wall and an open upper end, a pair of concentric sizing screens mounted adjacent the open end of said drum to separate oversize and undersize pellets from pellets of a predetermined size, a concentrically arranged truncated conical lifter means for receiving said oversize and undersize pellets from said sizing screens, said lifter means being mounted adjacent the open end of said drum, lifting members circumferentially arranged around the periphery of said lifter means for lifting said oversize and undersize pellets, a feed conveyor for said drum, chute means to recycle material from said lifter means to said feed conveyor, a roll dryer concentrically mounted around said drum and adapted to receive sized pellets from said sizing screens, and means to pass air through said roll dryer.

5. Apparatus for the production of pressure hardened pellets from pulverulent material comprising, a rotatably mounted truncated conical drum member for forming pellets from said pulverulent material said drum member having a base forming the back wall of the drum, a side wall and an open upper end, said drum being mounted at an angle of between about 15 and 35° upwards from the horizontal, a pair of concentric sizing screens mounted adjacent the open end of said drum to separate oversize and undersize pellets from pellets of a predetermined size, a concentrically arranged truncated conical lifter means for receiving said oversize and undersize pellets from said sizing screens, said lifter means being mounted adjacent the open end of said drum, and said lifter means having a larger diameter than and surrounding said sizing screens, lifting members circumferentially arranged around the periphery of said lifter means for lifting said oversize and undersize pellets, a feed conveyor for said drum, chute means to recycle material from said lifter means to said feed conveyor, a roll dryer concentrically mounted around said drum and adapted to receive said pellets of a predetermined size from said sizing screens, and means to pass air through said roll dryer.

6. Apparatus for the production of pressure hardened pellets from pulverulent material comprising a rotatably mounted drum member formed substantially in the shape of a truncated cone said truncated cone having an axis of rotation, a closed base, an open upper end smaller than the size of said base, and a side wall extending from said base to said open upper end, the diameter of said drum member diminishing from said closed base to said open upper end at a substantially constant rate, and said drum member being mounted with its axis of rotation at an angle of from 15 to 35° upwards from the horizontal.

7. Apparatus for the production of pressure hardened pellets from pulverulent material comprising a rotatably mounted drum member formed substantially in the shape of a truncated cone said truncated cone having an axis of rotation, a closed base, an open upper end smaller than the size of said base, and a side wall extending from said base to said open upper end, the diameter of said member diminishing at a substantially constant rate from said base to said open upper end, said drum member being mounted with its axis of rotation at an angle of from 15 to 35° upwards from the horizontal, and the ratio of the length of said side wall of said drum to the diameter of said base to the diameter of said upper end being about 0.35–0.80:1.0:0.50–0.90.

8. Apparatus for the production of pressure hardened pellets from pulverulent material comprising a rotatably mounted drum member formed substantially in the shape of a truncated cone said truncated cone having an axis of rotation, a closed base, an open upper end smaller than the size of said base, and a side wall extending from said base to said open upper end, the diameter of said drum member diminishing from said closed base to said open upper end at a substantially constant rate, a roll dryer concentrically mounted around said drum and adapted to receive pellets from said drum, and means to pass air through said roll dryer to dry said pellets.

References Cited by the Examiner

UNITED STATES PATENTS

| | | | |
|---|---|---|---|
| 2,709,833 | 6/55 | Wiklund | 18—1 |
| 2,828,190 | 3/58 | King | 18—1 |
| 2,843,043 | 5/58 | Haley et al. | 18—1 |
| 3,040,375 | 6/62 | Rowen | 18—1 |

FOREIGN PATENTS

| | | |
|---|---|---|
| 517,192 | 10/55 | Canada. |
| 498,469 | 9/54 | Italy. |

WILLIAM J. STEPHENSON, *Primary Examiner.*